United States Patent [19]

Rauterkus et al.

[11] Patent Number: 5,089,570
[45] Date of Patent: Feb. 18, 1992

[54] ORGANIC DISPERSION POLYMERS BASED ON ETHYLENICALLY UNSATURATED MONOMERS WHICH CONTAIN WATER-SOLUBLE GRAFT POLYMERS CONTAINING VINYL ALCOHOL UNITS HAVING A POLYURETHANE GRAFTING BASE, PROCESSES FOR THEIR PREPARATION AND THEIR USE

[75] Inventors: Karl J. Rauterkus; Matthias Kroggel, both of Kelkheim; Hans-Ullrich Huth, Egelsbach, all of Fed. Rep. of Germany

[73] Assignee: Hoechst Aktiengesellschaft, Frankfurt, Fed. Rep. of Germany

[21] Appl. No.: 412,845

[22] Filed: Sep. 26, 1989

[30] Foreign Application Priority Data

Sep. 28, 1988 [DE] Fed. Rep. of Germany ....... 3832877

[51] Int. Cl.⁵ .................... C08F 283/04; C08F 2/20
[52] U.S. Cl. ................... 525/455; 524/457; 526/202; 526/220
[58] Field of Search ............. 525/455; 524/457; 526/202, 220

[56] References Cited

U.S. PATENT DOCUMENTS 4,918,129  4/1990  Probst et al. ............... 524/457

FOREIGN PATENT DOCUMENTS 3732089  4/1989  Fed. Rep. of Germany .
58-225111  12/1983  Japan .
777484  6/1957  United Kingdom .
779557  7/1957  United Kingdom .

Primary Examiner—John C. Bleutge
Assistant Examiner—Thomas Hamilton, III
Attorney, Agent, or Firm—Bierman and Muserlian

[57] ABSTRACT

Dispersion polymers of ethylenically unsaturated monomers which are prepared in the presence of protective colloids and if appropriate emulsifiers by polymerization in an aqueous medium and are present in aqueous dispersion form or in finely dispersed dry powder form. They contain, as protective colloids, water-soluble graft polymers containing vinyl alcohol units on a polyurethane grafting base, the polyurethane grafting bases containing at least 2 urethane groups in the molecule prepared by reacting diisocyanates and diols, and polymer radicals of units of carboxylic acid vinyl esters having 3 to 20 carbon atoms and/or hydrolysis products thereof and if appropriate units of other ethylenically unsaturated monomers and/or hydrolysis products thereof being grafted onto the polyurethane grafting bases. The amount of vinyl alcohol units in the water-soluble graft polymers is at least 20% by weight and the degree of hydrolysis of the monomer units originally grafted onto the polyurethane grafting bases is at least 50 mol%.

The organic dispersion polymers are useful as a coating composition, as binders for building materials and as a starting material for the preparation of molding compositions, adhesives, binders, impregnating agents and paints.

5 Claims, No Drawings

ORGANIC DISPERSION POLYMERS BASED ON ETHYLENICALLY UNSATURATED MONOMERS WHICH CONTAIN WATER-SOLUBLE GRAFT POLYMERS CONTAINING VINYL ALCOHOL UNITS HAVING A POLYURETHANE GRAFTING BASE, PROCESSES FOR THEIR PREPARATION AND THEIR USE

The invention relates to organic dispersion polymers based on ethylenically unsaturated and polymerizable or copolymerizable monomers, which have been obtained in the presence of protective colloids, consisting of water-soluble graft polymers containing vinyl alcohol units on a polyurethane grafting base, by emulsion, suspension or bead polymerization or copolymerization, preferably emulsion polymerization or copolymerization, initiated by free radicals, processes for their preparation and their use, preferably in the form of an aqueous dispersion.

The water-soluble graft polymers containing vinyl alcohol units on a polyurethane grafting base which are used according to the invention as protective colloids and their preparation are, inter alia, the subject matter of the patent application 07-247694 filed Sept. 22, 1988 which has already been filed and to which reference is made here.

The use of water-soluble graft polymers containing vinyl alcohol units on a polyurethane grafting base as protective colloids for polymerizations in aqueous dispersion was not previously known and had not been proposed.

The invention thus relates to the use of water-soluble graft polymers containing vinyl alcohol units on a polyurethane grafting base as protective colloids in the preparation, by customary methods in an aqueous medium, of organic dispersion polymers by emulsion, suspension or bead polymerization or copolymerization, preferably emulsion polymerization or copolymerization, initiated by free radicals.

The use of water-soluble polymers as protective colloids or dispersing agents, such as, for example, polyvinyl alcohol, gelatin, alkali metal salts of polyacrylic acid, polyvinylpyrrolidone, cellulose ethers (containing carboxyl groups), polysaccharides (soluble starch) and suitable copolymers with functional groups based on vinyl acetate/acrylic acid/maleic acid or derivatives thereof, in emulsion polymerization, in particular in the homo- or copolymerization of vinyl esters, is known. First place in the use of high molecular weight synthetic dispersing agents, in particular those which have been prepared by polymerization, as is known is occupied in emulsion polymerization by polyvinyl alcohol (PVAL), which if appropriate can also be employed in modified form, for example as not completely hydrolyzed polyvinyl acetate, as partly acetalized or etherified polyvinyl alcohol or, for example, in the form of a hydrolyzed copolymer of vinyl acetate and ethylene.

In the preparation of vinyl acetate homo- or copolymer dispersions in particular—but in contrast less so in the case of the preparation of pure acrylate dispersions or of acrylic ester/styrene copolymer dispersions—the use of polyvinyl alcohol as a protective colloid is customary, it being possible to obtain both coarse—and fine-particled lattices, also without the addition of emulsifier.

Such polyvinyl acetate dispersions stabilized with polyvinyl alcohol (degree of hydrolysis of the PVAL 88%) are known for example from British Patent 779,557. The products are often coarse-particled, have a high to very high viscosity and can usually be employed only as adhesive dispersions.

According to British Patent 777,484, finer particled homopolymeric vinyl acetate lattices can be obtained by suitable combination of several protective colloids, for example of partly hydrolyzed polyvinyl acetate and an alkali metal salt of polymethacrylic acid. However, the homopolymers obtainable with these cannot be used as high quality coating agents or binders for dyeing.

Graft copolymers of vinyl acetate or vinyl propionate and ethylene on polyurethane grafting bases (backbones) are also known from Japanese Patent 58,225,111. Reaction products of long-chain glycols, for example polypropylene glycol, and polyisocyanates, for example toluylene diisocyanate, are used as the polyurethane grafting bases. The weight ratio of the ethylene and vinyl ester monomers to be grafted on should be 20:80 to 50:50. The grafting copolymerization is carried out in aqueous emulsion in the presence of protective colloids and nonionic surfactants and is said to lead to dispersion polymers of high molecular weight and fine particles.

The protective colloids which have been disclosed to date, in particular those based on polyvinyl alcohol, are known to have some decisive disadvantages. Although they can also be used in the emulsion copolymerization of vinyl esters, in particular vinyl acetate, with other monomers, for example (meth)acrylic esters, they are preferably employed for the preparation of vinyl ester homopolymer dispersions, and are used above all in the preparation of adhesive dispersions. In general, it is necessary also to use emulsifiers here, but in addition to the adverse influence of the polyvinyl alcohol on the water-resistance of dispersion polymer films, this additionally reduces their water resistance. Most known protective colloids, in particular PVAL, moreover cannot be used without problems for emulsion polymerization of acrylic and methacrylic acid esters and of vinyl aromatics. The invention was thus based on the object of developing a protective colloid which is as universally applicable as possible and which can be employed in the emulsion polymerization of all the customary $\alpha,\beta$-ethylenically unsaturated and polymerizable compounds, such as vinyl esters, (meth)acrylic esters, vinyl aromatics, ethylene, vinyl chloride, (meth)acrylonitrile and the like, overcoming the disadvantages of known protective colloids, the use of further stabilizers, such as surface-active compounds, poly-salts or ionic monomers, either being completely unnecessary or necessary to only a minor degree and it being possible to avoid adverse influences on secondary products, such as, for example, coatings and paint films, as a result of deterioration of the water-resistance of the dispersion polymer films.

It has now been possible, surprisingly, to achieve the object set by using the water-soluble graft polymers characterized below as protective colloids, in particular in emulsion polymerization.

The invention therefore relates to organic dispersion polymers based on ethylenically unsaturated, polymerizable or copolymerizable monomers which have been prepared in the presence of protective colloids or protective colloids and emulsifiers by emulsion, suspension or bead polymerization or copolymerization, preferably emulsion polymerization or copolymerization, initiated by free radicals in an aqueous medium and are in aqueous dispersion form or in finely dispersed dry powder form, wherein their preparation has been carried out in the presence of, as the protective colloid, water-soluble graft polymers containing vinyl alcohol units on a polyurethane grafting base and these graft polymers are contained in the dispersion polymer, the polyurethane grafting base in the water-soluble graft polymer used as the protective colloid containing at least 2 urethane groups in the molecule and units of diisocyanates and if appropriate small amounts of monofunctional isocyanates, as well as units of diols and/or half-esterified or half-etherified diol radicals, and polymer radicals or polymeric chains of units of carboxylic acid vinyl esters having 3 to 20 carbon atoms and/or hydrolysis products thereof and if appropriate units of other ethylenically unsaturated polymerizable and if appropriate hydrolyzable and if appropriate copolymerized monomers and/or hydrolysis products thereof being grafted onto the polyurethane grafting base, the amount of vinyl alcohol units in the water-soluble graft polymer being at least 20% by weight, preferably 30 to 85% by weight and in particular 35 to 75% by weight, based on the water-soluble graft polymer, and the degree of hydrolysis of the monomer units grafted onto the polyurethane grafting base being at least 50 mol %, preferably more than 70 mol % and in particular more than 86 mol %.

The water-soluble graft polymers containing vinyl alcohol units on a polyurethane grafting base which are used according to the invention are preferably contained in the dispersion polymers in amounts of 0.01 to 20% by weight, in particular 0.1 to 10% by weight and particularly preferably 0.5 to 6% by weight, based on the dispersion polymer.

The polyurethane grafting bases contained in the water-soluble graft polymers containing vinyl alcohol units preferably have molecular weights in the range from 200 to 50,000 g/mol, particularly preferably >5,000 g/mol.

In the water-soluble graft polymers containing vinyl alcohol units on a polyurethane grafting base, the amount of polymer radicals, grafted onto the polyurethane grafting base, in the graft polymers used according to the invention as water-soluble protective colloids is preferably >10% by weight, in particular 40 to 95% by weight and particularly preferably 56 to 90% by weight, based on the water-soluble graft polymer. The polymer radicals grafted onto the polyurethane grafting base are preferably completely or partly hydrolyzed.

The properties profile of the water-soluble graft polymers containing vinyl alcohol units which are used according to the invention is influenced, inter alia, by the molecular weight and the build-up of the polyurethane grafting bases, the nature, composition and amount of monomer units grafted on and the molecular weight and degree of hydrolysis of the graft polymer.

As already stated above, the polyurethane grafting bases consist of polyurethanes having at least 2 urethane groups in the molecule, there being no particular upper limit to the number of urethane groups per grafting base molecule, which can in general assume higher values than 2.

The polyurethane grafting bases can be prepared by customary processes of polyurethane synthesis and are preferably synthesized using catalysts, such as, for example, tertiary amines or organic tin compounds, at temperatures between 60° and 120° C., preferably between 70° and 100° C.

They are built up from diol and diisocyanate components. In principle, all the diols which can be used in polyurethane synthesis can be employed. Preferred diols are cycloaliphatic diols, such as, for example, cyclohexanediols, and aliphatic diols with preferably 2 to 12 C atoms. Polyalkylene glycols, such as, for example, polypropylene oxides, polybutylene oxides and copolymers of ethylene oxide, propylene oxide and butylene oxide, preferably block copolymers thereof, are preferred, and the so-called polyethylene glycols or polyethylene oxides, that is to say, in particular, the α,ω-dihydroxypolyethylene oxides, are particularly preferred.

Polyethylene glycols having molecular weights between 400 and 10,000 g/mol are preferably used, polyethylene glycols having molecular weights between 400 and 1,500 g/mol being particularly preferred. If appropriate, the polyethylene glycols are employed in combination with low molecular weight aliphatic diols, such as, for example, 1,4-butanediol, 1,3-propanediol, ethylene glycol and diethylene glycol. A molar ratio of polyethylene glycol to low molecular weight aliphatic diol of 1:0.1 to 1:0.7 is preferably present.

The diisocyanate components used are aromatic diisocyanates, such as, for example, m- and p-diisocyanatoxylene, 2,4-diisocyanatotoluene, 2,6-diisocyanatotoluene or mixtures of the last two isomers, 1,5-diisocyanatonaphthalene, 4,4'-diisocyanatodiphenylmethane and 4,4'-diisocyanatophenyl-benzyl ether.

Aliphatic and/or cycloaliphatic diisocyanates are preferably employed. Preferred aliphatic diisocyanates are, for example, those having 2 to 12 carbon atoms, in the aliphatic radical such as, for example, ethylene diisocyanate, propylene diisocyanate, tetramethylene diisocyanate and 2,2,4-trimethylhexamethylene diisocyanate. Preferred cycloaliphatic diisocyanates are, for example, 1,4-diisocyanatocyclohexane, 4,4'-methylenebis(cyclohexyldiisocyanate), 1-methylcyclohexyl 2,4-diisocyanate, 1-methylcyclohexyl 2,6-diisocyanate and 1,3-bis(isocyanatomethyl)cyclohexane.

The use of hexamethylene 1,6-diisocyanate and/or, in particular, isophorone diisocyanate is particularly preferred.

The molar ratios of diol to diisocyanate components are preferably between 1:0.99 and 1:0.5, in particular between 1:0.98 and 1:0.7. The average molecular weight of the polyurethanes are preferably between 200 and 50,000 g/mol, in particular between 1,000 and 35,000 g/mol and particularly preferably between 3,000 and 17,000 g/mol. The average molecular weights (weight average) can be determined by customary experimental and/or mathematical methods. Monoisocyanates can be used to regulate the molecular weight in the preparation of the polyurethane grafting bases.

It should be pointed out that, for example, for a given molecular weight for the grafting base, the number of its urethane groups depends directly on the molecular weights of the diol and diisocyanate components used.

Vinyl carboxylates having 3 to 20 carbon atoms are preferably employed for grafting onto the polyurethane grafting bases. Vinyl acetate and/or vinyl propionate, in particular vinyl acetate, are particularly preferred. Mixtures of vinyl acetate and/or vinyl propionate and vinyl versatate are furthermore preferred.

Vinyl acetate is preferably grafted on. In particular in the partial or complete hydrolysis of the graft polymers, which is required according to the invention, after the grafting polymerization, it is advantageous also to use vinyl propionate, in addition to vinyl acetate, in the grafting. Copolymerizable mixtures of vinyl carboxylates can also be grafted on, preferably mixtures of vinyl acetate and vinyl versatate, it being possible for the vinyl versatate content to be 0.2 to 10% by weight, preferably 0.5 to 5% by weight, based on the vinyl acetate content. Grafting with various vinyl carboxylates in the form of block copolymers, if appropriate in combination with other ethylenically unsaturated and copolymerizable monomers, may also be advantageous.

The vinyl carboxylates can furthermore also be grafted on together with other ethylenically unsaturated copolymerizable monomers, such as, for example, maleic acid, itaconic acid, mesaconic acid, crotonic acid, acrylic acid or esters thereof.

Grafting is carried out using grafting catalysts which start free radical chains, preferred possible catalysts for this being all the agents which form free radicals and are soluble in the monomers, the monomer mixture or the monomer solution. Organic per-compounds, such as peroxides and percarbonates, and organic azo compounds have proved particularly suitable for the grafting, and compounds which are preferably used are azobis-isobutyronitrile, tert.-butylperoxy 2-ethylhexanoate and particularly preferably dibenzoylperoxide. The grafting reaction is carried out in the presence of preferably 0.013 to 1.3 mol %, in particular 0.026 to 0.27 mol %, of catalyst which forms free radicals, based on the amount of monomer.

The resulting graft polymers can be converted into partly or completely hydrolyzable products by hydrolysis, alcoholysis or transesterification, the degree of hydrolysis in the graft polymer being at least 50 mol %, preferably more than 70 mol % and in particular 85 to 99 mol %, based on the number of mol of monomer units grafted on.

The grafting reaction can be carried out, for example, in emulsion or in suspension, but it is preferably carried out in solution or in bulk.

The monomers to be grafted on are preferably metered continuously or discontinuously into the polyurethane grafting base, which has been initially introduced into the reaction vessel, it being advantageous for the rate of metering and the process parameters to be chosen so that the formation of non-grafted homopolymers is excluded as far as possible. The monomers can be added in bulk, if they are in liquid form, or as a solution. The catalyst is preferably dissolved in the monomer liquid or the monomer solution and it is metered in together with this. However, it can also be initially introduced, at least in part, into the reaction vessel together with the polyurethane grafting base. The grafting reaction is preferably carried out at temperatures between 40° and 120° C., in particular between 65° and 100° C., depending on the catalyst employed and, specifically in the case of bulk polymerization, depending on the polyurethane grafting base employed.

Alternatively, batch grafting polymerization is possible, but this process can often lead to mixtures of graft polymers and homopolymers of the monomers to be grafted.

The increase in the viscosity of the reaction mixture which occurs during grafting polymerization, especially in the case of bulk polymerization, can often lead to processing problems, which can be bypassed, for example, by continuous or discontinuous addition of solvents. Preferred suitable solvents are monofunctional alcohols, in particular methanol and ethanol, which can also already be used, if appropriate, for dissolving the monomers to be grafted on.

In the case of solution polymerization, the solvent content in the reaction mixture should preferably be less than 20% by weight, in particular less than 10% by weight, based on the reaction mixture.

After removal of the residual monomers (usually by azeotropic distillation with methanol), the resulting graft polymers can be precipitated in their non-hydrolyzed form by introducing the mixture into water. However, they can also be converted into the desired partly or completely hydrolyzed products after dilution with a solvent, preferably with methanol, by means of acid catalysts (for example, hydrochloric acid, phosphoric acid, p-toluenesulfonic acid etc.), or preferably using alkaline catalysts (for example, NaOH, KOH, NaOCH$_3$, KOCH$_3$ and the like), if appropriate also using water, by the customary processes which are known from the literature.

The amount of alkali metal hydroxide added is preferably 0.1 to 20 mol %, in particular 0.5 to 10 mol %, based on the amount of hydrolyzable monomeric units grafted on. The hydrolysis is preferably carried out between 20° and 60° C., and in particular by alkaline alcoholysis in a lower alkanol, preferably in methanol.

If the graft polymers also contain other comonomer units of ethylenically unsaturated monomers which can be hydrolyzed, in addition to the grafted-on vinyl ester units, these can also be hydrolyzed during the hydrolysis reaction or alcoholysis.

It has furthermore been found that the vinyl ester units having preferably 1 to 4 carbon atoms in the carboxylic acid radical in the graft polymers are particularly suitable for alkaline hydrolysis or alcoholytic cleavage, whereas vinyl ester units with longer-chain carboxylic acid radicals, preferably with longer-chain branched carboxylic acid radicals, are more resistant towards alkaline hydrolysis or alkaline alcoholysis, which may be of importance for the preparation of a number of partly hydrolyzed graft polymers.

The relevant synthesis parameters or synthesis variants and degrees of hydrolysis are in each case to be chosen and coordinated with one another so that water-soluble graft polymers are always obtained, since water-solubility, inter alia, is an important property feature for the usability, according to the invention, of the graft polymers as protective colloids, for example in emulsion polymerization.

The organic dispersion polymers according to the invention which are based on ethylenically unsaturated polymerizable and copolymerizable monomers which have been prepared in the presence of protective colloids or of protective colloids and emulsifiers by emulsion, suspension or bead polymerization or copolymerization initiated by free radicals in an aqueous medium and are present in aqueous dispersion form or in finely dispersed dry powder form, furthermore have the feature that, in addition to the water-soluble graft polymers containing vinyl alcohol units on a polyurethane grafting base which are described above as protective colloids, they also contain further polymeric constituents which contain, as monomer units, based on the polymeric constituents, a) 15 to 100% by weight, preferably 25 to 99% by weight, and in particular 45 to 98% by weight, of compounds from the group comprising vinyl esters, (meth)acrylic esters, maleic acid/fumaric acid esters, itaconic acid esters, crotonic acid esters, vinyl aromatics, α-olefins, ethylenically unsaturated nitriles, vinyl halides and vinylidene halides, and b) 0 to 60% by weight, preferably 0.5 to 30% by weight and in particular 1 to 10% by weight, of compounds from the group comprising ethylenically unsaturated ($C_3$-$C_5$)-monocarboxylic acids, ethylenically unsaturated ($C_4$-$C_6$)-dicarboxylic acids or half-esters thereof with aliphatic and optionally substituted ($C_1$-$C_8$)-alcohols, ethylenically unsaturated sulfonic acids or phosphonic acids or salts of these acids, hydroxy-($C_2$-$C_{18}$)alkyl acrylates, hydroxy-($C_2$-$C_{18}$)alkyl methacrylates, hydroxy-($C_2$-$C_{18}$)alkyl or di[hydroxy-($C_2$-$C_{18}$) alkyl] maleates or fumarates, hydroxy-($C_2$-$C_{18}$)alkyl crotonates, mono- or di-[hydroxy-($C_2$-$C_{18}$)alkyl] itaconates, monoesters or diesters of polyalkylene glycol ethers with ethylenically unsaturated ($C_3$-$C_5$)monocarboxylic acids or ethylenically unsaturated ($C_4$-$C_6$)-dicarboxylic acids, it also being possible for the terminal OH groups of the polyalkylene glycol ether radicals to be etherified or esterified, amides of ethylenically unsaturated ($C_3$-$C_6$)-mono- or -dicarboxylic acids which can be substituted on the amide nitrogen by radicals having 1 to 7 carbon atoms or methylol or ($C_1$-$C_{18}$)-alkoxymethylene radicals and ethylenically unsaturated urethanes or ureas or silanes, and c) 0 to 60% by weight, preferably 0.5 to 30% by weight and in particular 1 to 10% by weight, of ethylenically unsaturated primary, secondary or tertiary amines or quaternary ammonium compounds from the group comprising amino-($C_1$-$C_{24}$)alkylene acrylates or methacrylates, their mono- and di-($C_1$-$C_{24}$) alkylamino derivatives and their quaternary ammonium salts obtained by ($C_1$-$C_{24}$)-alkylation and their quaternary mono- and diallylammonium derivatives, and d) 0 to 5% by weight of ethylenically polyunsaturated compounds and/or ethylenically mono- or poly-unsaturated compounds containing other reactive groups, and e) 0 to 5% by weight of molecular weight regulators from the group comprising dodecylmercaptan, carbon tetrachloride, bromotrichloromethane, tetrakismercaptoacetylpentaerythritol and thioglycolic acid.

Of the monomer units listed above under a) to e), the following monomers are preferably used.

The preferred monomers for a) are vinyl esters of ($C_1$-$C_{18}$)-carboxylic acids, such as, for example, vinyl acetate, vinyl propionate, vinyl versatate, vinyl laurate and vinyl stearate, and furthermore acrylic acid esters and methacrylic acid esters of aliphatic straight-chain or branched ($C_1$-$C_{22}$)-alcohols in which all or some of the hydrogen atoms in the alcohol radical can be replaced by other atoms, such as, for example, fluorine or chlorine atoms, or by aromatic radicals, such as, for example, methyl methacrylate, butyl methacrylate, octyl methacrylate, ethyl acrylate, isobutyl acrylate, 2-ethylhexyl acrylate, behenyl acrylate, 2-phenylethyl acrylate, hexafluorobutyl methacrylate, tetrafluoropropyl methacrylate and dodecafluorooctyl acrylate, and furthermore crotonic acid esters of ($C_1$-$C_8$)-alcohols, such as, for example, methyl crotonate and 2-ethylhexyl crotonate, and furthermore maleic, fumaric or itaconic acid esters with ($C_1$-$C_8$)-alcohols, such as, for example, dimethyl maleate, dibutyl maleate, dioctyl maleate, dibutyl fumarate and dimethyl itaconate, and furthermore acrylic acid monoesters or methacrylic acid monoesters of diols or triols, which can be partly etherified, such as ethylene glycol, butane-1,4-diol, hexane-1,6-diol, glycerol, trimethylolpropane, and ethylene glycol monomethyl ether, and furthermore vinyl aromatic compounds, such as, for example, styrene, vinyltoluene and α-methylstyrene, and furthermore α-olefins, such as, for example, ethylene, and furthermore α,β-ethylenically unsaturated nitriles, such as, for example, cyanoethyl methacrylate, acrylonitrile or methacrylonitrile, and furthermore vinyl or vinylidene halides, such as, for example, vinyl chloride or vinylidene chloride, and furthermore mixtures of the monomers mentioned.

Preferred monomers for b) are crotonic acid, maleic acid, fumaric acid, itaconic acid, acrylic acid, methacrylic acid, maleic, fumaric and itaconic acid half-esters of branched or straight-chain ($C_1$-$C_8$)-alcohols, all or some of the hydrogen atoms of which in the alcohol radical can be replaced by halogen atoms, or mixtures of these monomers, and furthermore vinylsulfonic acid, acrylamidomethylpropane-sulfonic acid or -phosphonic acid, styrenesulfonic acid, the (1-propyl-3-sulfonic acid)ester of acrylic acid or methacrylic acid and the alkali metal or ammonium metal salts thereof, and furthermore esters of polyalkylene glycols which have 2 to 50 alkylene oxide units in the polyalkylene glycol radical with acrylic acid, methacrylic acid, crotonic acid, maleic acid or fumaric acid or with unsaturated ($C_5$-$C_6$)-dicarboxylic acids, for example polyethylene glycol crotonate, it also being possible for the terminal OH group of the polyalkylene glycol radical to be etherified or esterified, and furthermore α,β-ethylenically unsaturated carboxylic acid amides, such as, for example, vinylacetamide, acrylamide, methacrylamide, N-methylacrylamide, N,N-dimethylacrylamide,N-cyclohexylmethacrylamide,N-benzylmethacrylamide, N-(3-hydroxy-2,2-dimethylpropyl-)methacrylamide, N-methylolacrylamide, N-dimethylol-methacrylamide, N-methoxymethyl-methacrylamide N-butoxymethylacrylamide, or vinylpyrrolidone, and furthermore α,β-ethylenically unsaturated urethanes or ureas, such as, for example, allyl 1-(2-aminoethyl)-ethyleneureidocarbamate,N-methylcarbamidoethyl methacrylate, N-butylcarbamidoisopropyl methacrylate, N-octadecylcarbamidoethyl acrylate, N-phenylcarbamidoethylmethacrylate,N-cyclohexylcarbamidoethyl acrylate, 2-methacryloylethylurea, 2-octylmetharcryloylethylurea, 2-phenylmethacryloylethylurea, and furthermore α,β-ethylenically unsaturated silanes, such as, for example, vinyltrimethoxysilane, vinyltriethoxysilane,methacryloxypropyltrimethoxysilane, methacryloxypropyltris(methoxyethoxy)-silane, vinyltris(methoxyethoxy)-silane and vinyltriacetoxysilane.

Preferred monomers for c) are dimethylaminoethyl methacrylate, dimethylaminopentyl acrylate, dimethylaminopropyl methacrylate, aminoethyl methacrylate, 2-N-morpholinoethyl acrylate, t-butylaminoethyl methacrylate, 4-methacrylamido-2,2,6,6-tetramethylpiperidine, trimethylammonium-ethyl(meth)acrylate chloride, β-acetamidodiethyl-aminoethyl(meth)acrylate chloride, trimethylammonium-propylacrylate chloride and methacrylate chloride, trimethylammoniumethylacrylate bromide and methacrylate bromide, trimethylammonium-neopentylmethacrylate chloride and -acrylate chloride, diallyldimethylammonium chloride and diallyl-butyl-methyl-ammonium bromide.

Preferred monomers for d) are divinylbenzene, diallyl phthalate, butanediol diaacrylate and dimethacrylate, ethanediol dimethacrylate, hexanediol dimethacrylate, ethanediol diacrylate, hexanediol diacrylate, pentaerythritol triacrylate, trimethylolpropane triacrylate, tetraethylene glycol diacrylate, tripropylene glycol diacrylate, trimethylolpropane trimethacrylate, triallyl cyanurate and isocyanatoethyl methacrylate.

Preferred monomers for e) are dodecylmercaptan, carbon tetrachloride and tetrakismercaptoacetylpentaerythritol. A dispersion polymer built up from components according to the invention can be prepared, for example, by customary emulsion, suspension or bead polymerization initiated by free radicals, the solids content of the resulting dispersion preferably being between 5 and 70% by weight. The preferred preparation process is emulsion polymerization, the protective colloid according to the invention preferably being present in total in the aqueous phase.

The emulsion polymerization can be carried out by customary methods, that is to say the customary ionic and nonionic emulsifiers can be employed for emulsifying the monomers and for stabilizing the resulting latex. Possible anionic emulsifiers are, for example: alkyl sulfates, alkylarylalkoxy sulfates, alkylarylsulfonates and alkali metal and/or ammonium salts of alkyl- and alkylaryl-polyglycol ether-sulfates, and possible nonionic emulsifiers are, for example: oxyethylated fatty alcohols or oxyethylated alkylphenols, and also block copolymers of ethylene oxide and propylene oxide. Another class of emulsifier are cationic surfactants, such as, for example, primary, secondary or tertiary fatty amines or fatty amine oxyethylates in combination with organic or inorganic acids, and furthermore quaternary alkylammonium compounds. Amphoteric surfactants with a zwitterion structure, such as, for example, alkylamidopropylbetaines, can also be employed.

The amount of emulsifier to be employed is in general 0.01 to 10% by weight, preferably 0.1 to 5% by weight, based on the total monomer weight.

The choice of emulsifiers or of emulsifier combinations depends on the desired charging character of the latex to be formed, which can be either negative or positive. In no way should the surfactants be incompatible with one another or with ionic functional groups of comonomers, as this would interfere with the stability of the dispersion and could lead to precipitation of the latex particles.

The use of the water-soluble graft polymers, described above, containing vinyl alcohol units on polyurethane grafting bases as protective colloids in the preparation of the dispersion polymers according to the invention by polymerization initiated by free radicals in an aqueous medium is important according to the invention. These graft polymers are in general very readily water-soluble and give clear aqueous solutions. They can be present in total or in part as a solution in water in the aqueous liquor, for example in the case of emulsion polymerization, depending on the polymerization process—metering, pre-emulsion, batch—or can be used to stabilize the pre-emulsions by themselves or in combination with other protective colloids or surfactants. If only a portion is present, the remainder can be metered in uniformly or non-uniformly as an aqueous solution in parallel with the monomer. It may sometimes also be appropriate to meter in the aqueous graft polymer solution with a long delay, that is to say very much later after the start of polymerization. In such cases, the stability of the dispersion formed must be guaranteed by the amount of emulsifier and/or other protective colloids present or of comonomers which have a protective colloid function. If other stabilizers can or are to be dispensed with, the influence of the graft polymer must be taken into consideration, in particular in respect of the technological properties of the dispersion polymer to be formed, such as, for example, viscosity of the dispersion, gloss, adhesion, flow, pigment-bonding capacity, blushing and resistance to water and hydrolysis of the film and corrosion properties, for example on metals.

If the use of other water-soluble polymers as protective colloids should be advantageous or desirable, in such cases nonionic, cationic or anionic protective colloids can additionally also be used. These include, for example, polyvinyl alcohol, which can be cationically modified, polysaccharides (soluble starch), cellulose ethers, carboxymethylcellulose, polyacrylic acid, pectins, alginates, polyvinylpyrrolidones, polypeptides, gelatin, agar, chitosan or soluble copolymers with functional groups, individually or in combination, as long as they do not interfere, if appropriate because of their charge, by acting on other constituents of the dispersion. The amount of such additional protective colloids can be 0.05 to 10% by weight, preferably 0.1 to 4% by weight, based on the dispersion polymer.

The invention furthermore also relates to a process for the preparation of the organic dispersion polymers described above from ethylenically unsaturated polymerizable or copolymerizable monomers by emulsion, suspension or bead polymerization or copolymerization initiated by free radicals in an aqueous medium in the presence of protective colloids or of protective colloids and emulsifiers and isolation of the dispersion polymers in an aqueous dispersion form or in a finely dispersed dry powder form, obtained from the aqueous dispersion form by elimination of the aqueous phase, which comprises using water-soluble graft polymers containing vinyl alcohol units on a polyurethane grafting base as the protective colloid in the aqueous phase during the polymerization, preferably in an amount of 0.01 to 20% by weight, in particular 0.1 to 10% by weight and particularly preferably 0.5 to 6% by weight, based on the total amount of monomer.

A particularly preferred process variant is emulsion polymerization. The aqueous polymer dispersions obtained according to the invention have solids contents of preferably 5 to 70% by weight, in particular 10 to 60% by weight and particularly preferably 25 to 55% by weight, based on the aqueous dispersion.

The dispersion polymers can be isolated from their aqueous dispersions in anhydrous powder form by removing the water content from the aqueous dispersions, for example by spray drying or by precipitation of the polymer content and filtration.

In selecting the polymerizable or copolymerizable monomers to be used in the polymerization process according to the invention, such as have already been described above, in particular under a) to e), the following aspects, inter alia, should be paid particular attention in respect of the nature and proportions of comonomers.

With the particular comonomers to be used, on the one hand copolymerization of these monomers with one another must on principle be possible, and on the other hand it must also in fact be feasible under the process conditions to be observed.

In the simplest case, this can be estimated with the aid of the copolymerization parameters or the Q and e values of the monomers (compare, for example, Brandrup, Immergut, Polymer Handbook, 2nd edition (1975), John Wiley & Sons, New York). Under certain circumstances, when certain comonomers are chosen the monomer mixing ratio must be chosen according to the extent to which copolymerization is possible by varying the synthesis process, and inter alia specifically the manner of metering of the monomer. Thus, if appropriate, copolymerizations can in some cases be forced by initially introducing one or more monomer components and only metering in the remaining monomers or the remaining monomer mixture in the course of the polymerization. In the case of emulsion copolymerization, in this connection it may be of decisive importance whether the metering in of the monomers is carried out in bulk or as an aqueous emulsion. Analogous comments also apply here to the nature of the emulsifier addition. For example, considerable differences can be observed in respect of particle size, particle size distribution and stability of the copolymer dispersion, depending on whether the emulsifier has been initially introduced or whether it has been metered in during the copolymerization.

The choice of monomers and their mixing ratios moreover depends on the desired technological properties of the dispersions or the dispersion polymers, it being possible to use the selection criteria known to the expert to establish these properties.

When the dispersion polymers according to the invention are used in the form of their aqueous dispersions, their minimum film-forming temperature (MFT) should be below or in the range of the envisaged use temperature, that is to say, preferably between 0° and 80° C., in particular between 0° and 40° C.

If dispersion polymers with a harder formulation, that is to say those which have higher glass temperatures ($T_G$) are used, the customary film-forming auxiliaries or external plasticizers can also be used to achieve the required MFT. If these are not desired, the MFT should particularly preferably be in the range between 0° and 25° C.

The following monomer combinations are especially suitable in the weight ratios stated (PW = parts by weight) for the preparation of dispersion polymers according to the invention, for example by emulsion polymerization, also using graft polymers according to the invention as the protective colloid:

| | |
|---|---|
| butyl acrylate/methyl methacrylate | 10–90 PW/90–10 PW |
| butyl acrylate/styrene | 10–90 PW/90–10 PW |
| octyl acrylate/methyl methacrylate | 5–80 PW/95–20 PW |
| octyl acrylate/styrene | 5–80 PW/95–20 PW |
| vinyl acetate/butyl acrylate | 40–80 PW/60–20 PW |
| vinyl acetate/vinyl versatate | 50–80 PW/50–20 PW |

All the systems, for example, which are customary in emulsion polymerization and preferably water-soluble and initiate free radical chains, some of these systems including anionic compounds, can be used in amounts of 0.01 to 2% by weight, based on the total amount of monomer, to start the polymerization, such as, for example, 2,2'-azobis(2-amidinopropane) dihydrochloride, 2,2'-azobis(N,N'-dimethyleneisobutyramidine) dihydrochloride, 4,4'-azobis(4-cyanovaleric acid), $H_2O_2$, t-butyl hydroperoxide, persulfates, such as, for example, ammonium persulfate, sodium persulfate and potassium persulfate, redox systems, such as, for example, $H_2O_2$/ascorbic acid—the latter system above all for reducing the residual monomer content in the after-reaction phase of the polymerization—and high-energy radiation and customary photoinitiators.

One of the advantages of the graft polymers according to the invention consists, above all, inter alia, in the fact that they can be used as protective colloids for the preparation of emulsion polymers without other stabilizers having to be employed, which has a particularly advantageous effect in the preparation of stable pure acrylate and styrene/acrylic ester copolymer dispersions, and moreover the dispersion polymer films obtainable therefrom exhibit a significantly better adhesion to most solid substrates, such as, for example, metals, plastics and mineral or vegetable surfaces, in comparison with those analogous dispersion polymer films with contents of known protective colloids. With a suitable polymer buildup of the graft polymer according to the invention, after the coating of substrates with the dispersion polymer and subsequent drying at 50° to 150° C., preferably 80° to 190° C., crosslinking with any other functional groups still present in the dispersion polymer and hence hardening of the dispersion polymer coating may occur.

The dispersion polymers obtained according to the invention can be very advantageously used for a number of various fields of use either in bulk or, preferably, in the form of their aqueous dispersions or as a solution in organic solvents. The products according to the invention can preferably be used as a coating composition for solid substrates, in particular as a non-corrosive primer composition for metals, in the construction industry as binders in the preparation of concrete, mortar, plaster and paints, as a starting material for the production of films, foils, fibers, adhesives, lacquers, pressing compositions and shaped articles, as a thickener in liquid formulations, as an impregnating agent for porous substrates, and furthermore also as auxiliaries for sticking leather, textiles and paper and as binders in paper making, paper finishing, textile impregnation and in the preparation of paints, and in the building materials industry.

The invention is illustrated in more detail by the following examples.

EXAMPLE 1

Preparation of a water-soluble graft polymer containing vinyl alcoholate units on a polyurethane grafting base.

Preparation of a polyurethane grafting base

The diol component consisting of a mixture of polyethylene glycol of molecular weight 1,500 (=PEG 1500) and 1,4-butanediol (=1,4-Bu) in a molar ratio of PEG 1500:1,4-Bu:1:0.43, and the catalyst, consisting of 1,4-dimethylpiperazine in an amount of 0.48 mol %, based on the molar amount of diisocyanate employed, are initially introduced into a reaction vessel with a stirrer under a nitrogen atmosphere and the mixture is heated to a reaction temperature of 72° C. The diisocyanate component, consisting of 0.9 mol of isophorone diisocyanate per mol of diol component mixture, is then metered in so that the temperature of the reaction mixture does not exceed 100° C. After all the diisocyanate component has been metered in, an after-reaction time of about 2 hours at about 80° to 100° C., while stirring and under a nitrogen atmosphere, is followed in order to bring the reaction to completion.

The completeness of the conversion and therefore the end of the reaction can be determined by analysis of the diisocyanate concentration by customary methods which are known from the literature (for example IR spectroscopy or titration).

The molar ratio of diol component to diisocyanate component is 1:0.9 and the molecular weight calculated therefrom for the resulting polyurethane (=polyurethane grafting base) is 12,770.

B) Preparation of a polyvinyl acetate graft polymer on a polyurethane grafting base 1,428 g of the polyurethane grafting base obtained in Example 1A) are heated to a temperature of 72° C. in a reaction vessel under a nitrogen atmosphere. The monomeric vinyl acetate to be grafted on is dissolved in methanol together with the free radical initiator, in the present case 0.2 mol % of dibenzoyl peroxide, based on the molar amount of monomeric vinyl acetate employed, and the mixture is slowly metered into the polyurethane grafting base so that formation of non-grafted vinyl acetate homopolymer is suppressed as far as possible. The temperature of the reactive polymerization mass should not exceed 120° C., preferably 100° C. The metering time is 420 minutes and the after-reaction time is 45 minutes. 3.5 g of monomeric vinyl acetate are used per g of polyurethane grafting base.

When the after-reaction has ended, any excess residual monomer is removed by azeotropic distillation with methanol.

The resulting polyvinyl acetate graft polymer contains 77.1% by weight of grafted-on polyvinyl acetate and has a limiting viscosity index $[\eta]$ of 18.8 mPa.s, measured in tetrahydrofuran solution at 25° C. in an Ostwald viscometer. The molecular weight of the graft polymer calculated mathematically from the conversion is 55,750 g/mol.

C) Preparation of a water-soluble graft polymer containing vinyl alcohol units on a polyurethane grafting base, which can be used as a protective colloid, for example in emulsion polymerization.

The graft polymer obtained in Example 1B) is transesterified or hydrolyzed in methanolic solution. For this, the graft polymer is dissolved to give a methanolic solution containing 50% by weight of solid, and 4.95 mol % of NaOH, based on the molar amount of grafted-on vinyl acetate units contained in the graft polymer, in 10% strength by weight methanolic solution is added at room temperature.

After a reaction time of 11 minutes at room temperature, gelling occurs in the reaction mass, and after a reaction time of 45 minutes the hydrolysis reaction has ended. The resulting gelatinous hydrolysis product is granulated in a customary mill and the granules are washed with methanol, with the addition of acetic acid up to a neutral pH reaction, and dried. The degree of hydrolysis of the resulting water-soluble hydrolysis product is 98.7 mol %. Its content of vinyl alcohol units is 62.0% by weight. It can be used according to the invention as a protective colloid without further purification.

EXAMPLE 2

18 g of oxyethylated nonylphenol, 0.9 g of Na ethenesulfonate, 2.5 g of Na acetate.3 H$_2$O, 12 g of the protective colloid according to the invention obtained according to Example 1C) and 3 g of a hydroxyethylcellulose (molar degree of substitution 2, average degree of polymerization 400) are dissolved in 570.7 g of desalinated water (E water) in a 2 l three-necked flask with a stirrer, reflux condenser and internal thermometer. 45 g of a mixture of 485 g of vinyl acetate and 115 g of vinyl versatate are added and the mixture is heated slowly to 80° C., 1.2 g of ammonium persulfate in 30 ml of E water being added at 50° C. Metering in of the remainder of the monomer mixture is started at from 70° C. and should be ended after 2.5 hours. After the polymerization has taken place at 80° C. for a further 15 minutes, the temperature is then reduced to 70° C. The temperature is subsequently kept at 70° C. for 1 hour and the mixture is then cooled to room temperature. The finished dispersion is stable to storage. It has a solids content of 49.8% by weight and an MFT of 14° C.

EXAMPLE 3

1.15 g of Na alkyl-polyglycol ether-sulfate (50% strength by weight aqueous) and 0.32 g of ammonium persulfate are dissolved in 309 g of desalinated water (E water) in a 2 l three-necked flask with a stirrer, reflux condenser and internal thermometer (initial mixture). A monomer emulsion (emulsion B) is then prepared from 357 g of E water, 18.4 g of Na alkyl-polyglycol ether-sulfate, 351 g of methyl methacrylate, 299 g of butyl acrylate, 8.15 g of methacrylic acid, 4.9 g of acrylic acid, 1.3 g of n-dodecylmercaptan and 2.99 g of ammonium persulfate. 6.5 g of WAM IV TM (manufacturer: Air Products) are added to one quarter of this monomer emulsion (emulsion A). After addition of 40 g of emulsion A to the initial mixture, this is heated up to 85° C., the start of the polymerization reaction is awaited and the remainder of emulsion A followed by emulsion B in succession are then metered in uniformly in the course of 2.5 hours. In parallel with the last 60% of emulsion B, 3.25 g of the protective colloid according to the invention obtained according to Example 1C), dissolved in 50 g of E water, are added dropwise. When the metering in has ended, the mixture is after-heated at 85° C. for 1 hour and, after cooling to room temperature, 10 ml of concentrated aqueous ammonia solution are added to the reaction mixture. A storagestable dispersion which is free from specks and has a solids content of 47.9% by weight and an MFT of 17° C. is obtained.

EXAMPLE 4

1.5 of oxyethylated nonylphenol and 0.75 g of the ammonium salt of a sulfated ethylene oxide-propylene oxide block copolymer are dissolved in 250.75 g of E water in a 2 l three-necked flask with a stirrer, reflux condenser and internal thermometer. 12 g of a monomer emulsion of 168.8 g of E water, 11.7 g of oxyethylated nonylphenol, 6.8 g of the ammonium salt of a sulfated ethylene oxide-propylene oxide block copolymer, 22.0 g of the protective colloid according to the invention obtained according to Example 1C), 8.8 g of methyl methacrylate, 4.4 g of acrylamide, 273.6 g of styrene, 202.4 g of octyl acrylate, 8.8 g of methacrylic acid and 4.4 g of acrylic acid are added and the initial mixture is heated up to 85° C. The polymerization is started by addition of 0.31 g of ammonium persulfate (APS) in 2.6 g of E water, and after pre-polymerization for 15 minutes the remainder of the monomer emulsion and, in parallel with this, 0.57 g of APS, dissolved in 17.0 g of E water, are metered in over a period of 4 hours at an internal temperature of the initial mixture of 80°–82° C. When the addition of monomer has ended, 0.13 g of APS, dissolved in 2.6 g of E water, is added and the reaction mixture is after-heated for 3 hours. After the first hour of the after-heating time, 1.14 g of APS, dissolved in 23.5 g of E water, and 0.57 g of sodium disulfite, dissolved in 23.5 g of E water, are uniformly metered in separately. At the end of the after-heating time, the mixture is allowed to cool to room temperature and the dispersion is brought to pH 8 with ammonia solution. A storage-stable latex with a solids content of 49.3% by weight and an MFT of 12° C. is obtained.

EXAMPLE 5

A liquor of 558.35 g of E water, 216 g of oxyethylated ($C_{13}$)-alcohol, 10.55 g of hydroxyethylcellulose (molar degree of substitution 2.5, average degree of polymerization 1,500), 3 g of sodium acetate.$3H_2O$, 3.6 g of sodium ethenesulfonate and 3.85 g of the protective colloid according to the invention obtained according to Example 1C) is prepared in a 2 l three-necked flask with a stirrer, reflux condenser and internal thermometer. After addition of 60 g of a monomer mixture of 576 g of vinyl acetate and 144 g of butyl acrylate, the initial mixture is heated up to 72° C. The polymerization is started at 65° C. by addition of 1.44 g of sodium persulfate (NaPS), dissolved in 38 g of E water, and metering in of the remainder of the monomer mixture is started at 68° C., this taking 3.5 hours. When the addition of the monomer has ended, 0.72 g of NaPS, dissolved in 18 g of E water, is added and the mixture is after-heated at 72° C. for 1 hour. The dispersion is then cooled and 0.6 ml of 30% strength $H_2O_2$ and 0.36 g of ascorbic acid, dissolved in 6 g of E water, are added at 40° C. The resulting finished storagestable dispersion has a solids content of 53.6% by weight and an MFT of 5° C.

EXAMPLE 6

5.9 g of sodium lauryl sulfate and 2.4 g of an oxyethylated nonylphenol are dissolved in 210 g of E water in a 2 l three-necked flask with a stirrer, reflux condenser and internal thermometer. After addition of 57 g of a monomer emulsion of 360.42 g of E water, 12.75 g of sodium lauryl sulfate, 3.6 g of oxyethylated nonylphenol, 13.1 g of the protective colloid according to the invention obtained according to Example 1C), 184.1 g of butylacrylate, 78.9 g of styrene, 6.75 g of methacrylic acid, 3.45 g of acrylic acid and 6.75 g of acrylamide, the contents of the glass are heated up to 85° C. 0.21 g of ammonium persulfate (APS), dissolved in 4.3 g of E water, are added and the remainder of the monomer emulsion and a further 0.74 g of APS, dissolved in 14.9 ml of E water, are uniformly metered in one quarter of an hour later in the course of 3 hours. After an after-reaction time of 2.5 hours at 83° C., the reaction mixture is cooled to room temperature and brought to pH 8 with ammonia. A storagestable dispersion with a solids content of 32.8% by weight and an MFT of <0° C. is obtained.

EXAMPLE 7

A liquor or 631 g of E water, 24 g of oxyethylated nonylphenol, 3 g of sodium ethenesulfonate, 2.5 g of sodium acetate.$3H_2O$, 12 g of an ethylene oxide-propylene oxide block copolymer, 30 g of the protective colloid according to the invention obtained according to Example 1C) and 2.5 g of potassium persulfate (KPS) is prepared in a 2 l three-necked flask with a stirrer, reflux condenser and internal thermometer. After addition of 60 g of a monomer mixture of 400 g of vinyl acetate and 200 g of vinyl versatate, the liquor is heated up to 80° C. and the remainder of the monomer mixture is metered in over the course of 2.5 hours. Thereafter, 0.5 g of APS, dissolved in 15 g of E water, is added and the mixture is allowed to after-react at 80° C. for 1 hour. During the subsequent cooling phase, a further 0.5 g of 30% strength $H_2O_2$ and 0.3 g of ascorbic acid, dissolved in 5 g of E water, are added. A low-viscosity storage-stable dispersion with a solids content of 49.7% by weight and an MFT of 10° C. is obtained.

COMPARISON EXAMPLE 1

The procedure is carried out analogous to Example 4, with the modification that instead of the protective colloid according to the invention obtained according to Example 1C), the same amount of a polyvinyl alcohol (degree of hydrolysis 98 mol %, viscosity of the 4% strength by weight aqueous solution: 4 mPa.s) is used. A suspension which contains many specks, is not storage-stable and is unusable is obtained.

COMPARISON EXAMPLE 2

The procedure is analogous to Example 7, with the modification that instead of the protective colloid according to the invention obtained according to Example 1C), the same amount of a polyvinyl alcohol (degree of hydrolysis 98 mol %, viscosity of the 4% strength by weight aqueous solution: 4 mPa.s) is used. The resulting dispersion is speckled and unstable, which manifests itself in the increase in specks when the latex is left to stand.

We claim:

1. An organic dispersion polymer based on ethylenically unsaturated, polymerizable or copolymerizable monomers which has been prepared in the presence of protective colloids or protective colloids and emulsifiers by emulsion, suspension or bead polymerization or copolymerization, initiated by free radicals in an aqueous medium and are in aqueous dispersion form or in finely dispersed dry powder form, which contain, as protective colloids, water-soluble graft polymers containing vinyl alcohol units on a polyurethane grafting base, the polyurethane grafting bases containing at least 2 urethane groups in the molecule prepared by reacting diisocyanates and optionally small amounts of monofunctional isocyanates, with diols and optionally half-esterified or half-etherified diol radicals, and grafted thereon polymer radicals or polymeric chains of units of carboxylic acid vinyl esters having 3 to 20 carbon atoms and hydrolysis products thereof and optionally units of at least one other ethylenically unsaturated polymerizable and optionally hydrolyzable monomers and hydrolysis products thereof, the amount of vinyl alcohol units in the water-soluble graft polymers being at least 20% by weight, based on the water-soluble graft polymer, and the degree of hydrolysis of the monomer units originally grafted onto the polyurethane grafting base being at least 50 mol %.

2. A dispersion polymer as claimed in claim 1, which contains water-soluble graft polymers containing vinyl alcohol units on a polyurethane grafting base, in an amount of 0.01 to 20% by weight, based on the dispersion polymer.

3. A dispersion polymer as claimed in claim 1, wherein the polyurethane grafting bases contained in the water-soluble graft polymers containing vinyl alcohol units have molecular weights of between 200 and 50,000 g/mol.

4. A dispersion polymer as claimed in claim 1, wherein the amount of polymer radicals grafted onto the polyurethane grafting bases in the water-soluble graft polymers containing vinyl alcohol units on a polyurethane grafting base is > 10% by weight, based on the water-soluble graft polymer.

5. A dispersion polymer as claimed in claim 1, wherein, in the water-soluble graft polymers containing vinyl alcohol units on a polyurethane grafting base, the polyurethane grafting base contains, in the diol component, units of alkylene glycol or polyalkylene glycol having a molecular weight of between 400 and 10,000 g/mol, or mixtures of these units, or mixtures of these units with units from lower alkylene glycols having up to 6 carbon atoms.

* * * * *